US008844010B2

(12) United States Patent
Brady et al.

(10) Patent No.: US 8,844,010 B2
(45) Date of Patent: *Sep. 23, 2014

(54) AGGREGATION OF EMAILED PRODUCT ORDER AND SHIPPING INFORMATION

(75) Inventors: Scott J. Brady, Menlo Park, CA (US); Benjamin A. Suppe, San Francisco, CA (US); Eric J. Botto, Palo Alto, CA (US); Harpinder Singh Madan, Foster City, CA (US); Ievgen Mastierov, Odessa (UA); Aditya Khosla, Sunnyvale, CA (US); Dmytry B. Mykhaylov, San Jose, CA (US); Georgii Verbytskyi, Odessa (UA)

(73) Assignee: Project Slice, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/185,943

(22) Filed: Jul. 19, 2011

(65) Prior Publication Data
US 2013/0024924 A1 Jan. 24, 2013

(51) Int. Cl.
G06F 7/04 (2006.01)
G06F 15/16 (2006.01)
H04L 29/06 (2006.01)
G06F 17/30 (2006.01)
G06Q 30/06 (2012.01)
G06Q 10/10 (2012.01)
G06Q 30/00 (2012.01)
H04L 12/58 (2006.01)
G06F 21/31 (2013.01)

(52) U.S. Cl.
CPC .......... *G06Q 30/0601* (2013.01); *G06Q 10/107* (2013.01); *G06Q 30/00* (2013.01); *H04L 12/58* (2013.01); *G06F 21/31* (2013.01)
USPC ............................................. 726/7; 709/206

(58) Field of Classification Search
CPC ..................................................... G06Q 10/107
USPC .............................................. 726/7; 709/206
See application file for complete search history.

(56) References Cited

U.S. PATENT DOCUMENTS 7,082,426 B2 7/2006 Musgrove et al.
7,627,641 B2 12/2009 Aslop
(Continued)

FOREIGN PATENT DOCUMENTS

EP     1139264 A2    4/2001
WO  2001037540 A2    5/2001

OTHER PUBLICATIONS

Unknown, "ANTLR Parser Generator", in ANTLR.org (http://web.archive.orgl/web/20100620094636/http://www.antlt.org/), archived Jun. 20, 2010, pp. 1-3.

(Continued)

*Primary Examiner* — Linglan Edwards
*Assistant Examiner* — Lawrence Cosby
(74) *Attorney, Agent, or Firm* — Gard & Kaslow LLP (57) ABSTRACT

Product order and shipping information received via email messages is automatically aggregated for ready user review. Once the user is authenticated, authorization to access their email mailbox is obtained and the email message headers of their mails are analyzed to identify those messages of interest. The bodies of the email messages of interest are parsed to extract the product order and shipping information which is stored and presented for display to the user typically grouped by individual product thus greatly simplifying user review of orders.

14 Claims, 6 Drawing Sheets

(56) References Cited

U.S. PATENT DOCUMENTS

| | | | |
|---|---|---|---|
| 7,747,693 B2 | 6/2010 | Banister | |
| 7,899,871 B1* | 3/2011 | Kumar et al. | 709/206 |
| 2002/0046248 A1* | 4/2002 | Drexler | 709/206 |
| 2004/0177120 A1 | 9/2004 | Kirsch | |
| 2006/0122899 A1* | 6/2006 | Lee et al. | 705/26 |
| 2008/0073429 A1 | 3/2008 | Oesterling et al. | |
| 2008/0307046 A1 | 12/2008 | Baek et al. | |
| 2011/0246239 A1 | 10/2011 | Vdovjak et al. | |

OTHER PUBLICATIONS

Unknown, "Backus-Maur Form", in Wikipedia (http://web.archive.org/web1/20100703105305/http://en.wikipedia.org/wiki/Backus-Nair_form), archived Jul. 3, 2010, pp. 1-7.

Hammer, E, "Beginner's Guide to OAuth-Part II: Protocol Workflow", in Hueniverse.com (httpli://hueniverse.com/2007/10/beginners-guide-to-oauth-part-ii-protocol-workflow/), Oct. 15, 2007 through Jun. 18, 2011, pp. 1-21.

Johnson, D., "Sidebar: What is OAuth and why should you care?", in Blogging Roller (http://rollerweblogger.org/roller/entry/sidebar_what_is_oauth), Mar. 23, 2009, pp. 1-3.

Unknown, "Context-Free Grammar", in Wikipedia (http://web.archive.orgi/web/20100210122803/http://en.wikipedia.org/wiki/Context-free_grammar), archived Feb. 10, 2010, pp. 1-17.

Unknown, "Data decluplication", in Wikipedia (http://en.wikipedia.org/wiki/Data_deduplication), accessed May 27, 2011, pp. 1-7.

Unknown, "Email protocols: POP, IMAP and MAPI", in Information Technology, Miller School of Medicine at the University of Miami (http://web.archive.org/web/20100714072417/http://it.med.miami.edu/x1111.xml), archived Jul. 14, 2010, pp. 1-6.

Unkown, "Authentication and Authorization for Google APIs: Federated Login for Google Account Users", in code. google.com ((http://web.archive.org/web/20100614141450/http://code.google.com/apis/accounts/docs/OpenID.html), archived Jun. 14, 2010, pp. 1-16.

Unknown, "Authentication and Authorization for Google APIs: OAuth 1.0 for Web Applications", in code.google.com (http.//web.archive.org/web/20110429191860/http://code.google.com/apis/accounts/docs/OAuth.html), archived Apr. 29, 2011, pp. 1-7.

Unknown, "Lexers vs parsers", in stackoverflow.com (http://stackoverflow.com/questions/2842809/lexers-vs-parsers), May 16, 2010 through Sep. 1, 2010, pp. 1-5.

Lu, Jianguo, "03-60-214 Computer Languages, Grammars, and Translators: Grammars", course lecture slides in School of Computer Science, University, of Windsor (http://cs.uwindsor.ca/~jlu/214/214Introduction2012.ppt), Feb. 11, 2011, pp. 0-17.

Unknown, "OAuth", in Widipedia (http://web.archive.org/web/20100618202240/http://en.wikipedia.org/wiki/OAuth), archived Jun. 18, 2010, pp. 11-3.

Unknown, "Introduction OAuth", in Oauth.net (http://oauth.net/about/), Sep. 5, 2007, pp. 1-4.

Unknown, "Terminology", in Hueniverse.com (http://hueniverse.com/oauth/guide/terminology/), Dec. 26, 2009, pp. 1-8.

Unknown, "What is Open1D?", in openid.net (http://web.archive.org/web/20100713025959/http://openid.net/get-an-openid/what-is-openid/), archived Jul. 13, 2010, p. 1.

Unknown, "OpenID", in Wikipedia (http://web.archive.org/web/20100623215831/http://en.wikipedia.org/wiki/OpenID), archived Jun. 23, 2010, pp. 1-17.

Unknown, "OpenID Explained", in openidexplained.com (http://web.archive.org/web/20100218112551/http://openidexplained.com/), archived Feb. 18, 2010, pp. 1-6.

Unknown, "Parsing", in Wikipedia (http://web.archive.org/web/20100528225235/http://en.wikipedia.org/wiki/Parsing), archived May 28, 2010, pp. 1-7.

Manohar, V. "What is OpenID and how can I use it?", in Vineet Manohar's Blog: Java, Web 2.0 and other Tech topics (http://www.vineetmanohar.com/2009/08/what-is-openid-and-how-can-i-use-it/), Aug. 14, 2009 through Mar. 25, 2011, pp. 1-10.

* cited by examiner

| Order/Shipping Information Aggregation Window | | | | |
|---|---|---|---|---|
| Order Date | Item Description | Price | Merchant | Status |
| May 25, 2011 | Ipod 2 tablet computing device (Order No. 123456) | $499.00 | Apple | Shipped |
| May 23, 2011 | Canon digital camera model no. 712 (Order No. 987654) | $217.99 | Amazon | Ordered |
| May 19, 2011 | Nike running shoes model no. XYZ (Order No. MNZ12ZY) | $113.99 | Nike Store | Delivered |
| May 11, 2011 | "Successful Startups" book by Bill Gates (Order No. 12ABC34) | $14.99 | Amazon | Delivered |

600

601 603 605 607 609 611

AGGREGATION OF EMAILED PRODUCT ORDER AND SHIPPING INFORMATION

BACKGROUND OF INVENTION

1. Field of the Invention

The present invention relates generally to gathering product order and shipping information and in particular to aggregating such information that was communicated by email.

2. Description of Prior Art

The acquisition of goods and services (hereinafter individually and collectively referred to as product) is ever increasing. Further, such acquisitions are commonly handled electronically today either by an online purchase or an electronic confirmation of such purchase. For example, it is common today to place an order with an online merchant such as AMAZON.COM® of Seattle, Wash. The online merchant then typically sends to the purchaser an order confirmation in an electronic form such as an email message. Subsequently, the online merchant and/or shipping company typically sends a shipping confirmation to the purchaser also in an electronic form such as an email message. While such transactions have become increasingly common and quite convenient, this convenience comes with some downsides as well.

Figure 1:
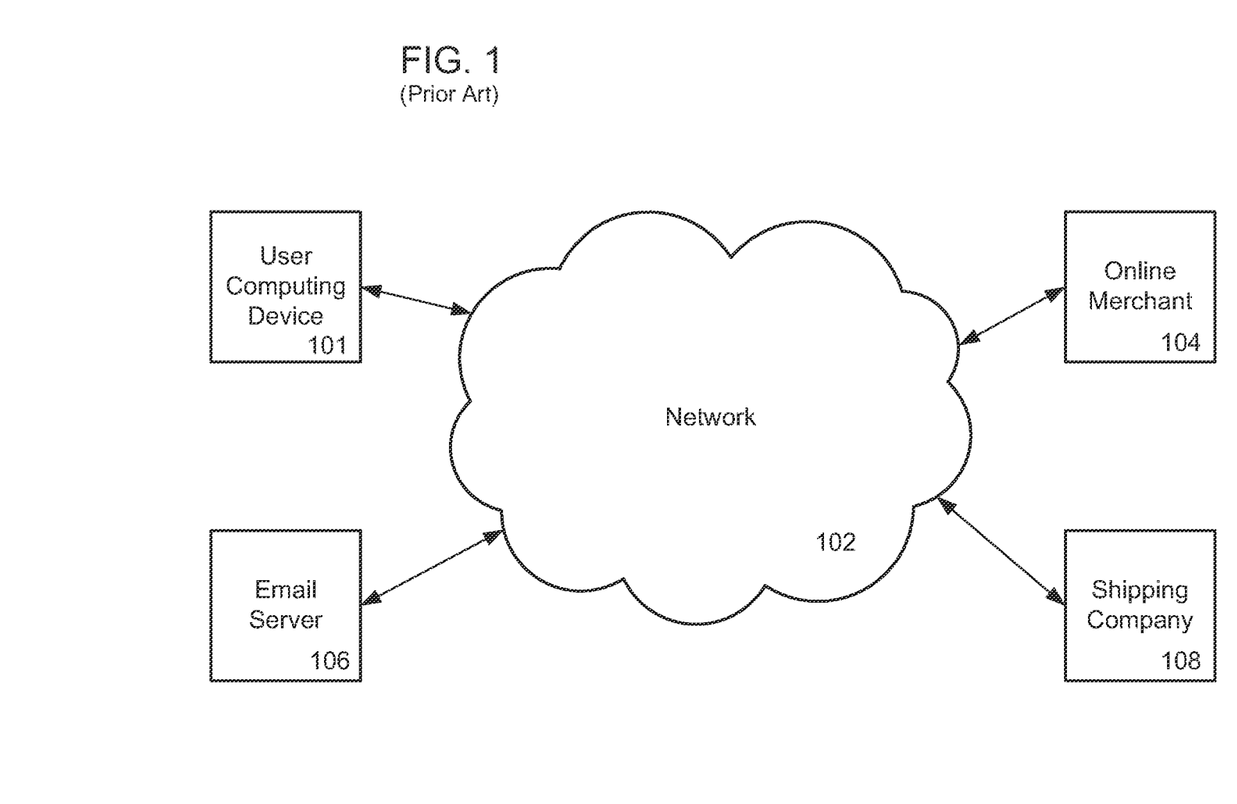
FIG. 1 is a typical prior art online transaction operating environment and scenario.

A typical prior art online transaction scenario will now be explained with reference to FIG. 1. As shown in FIG. 1, a user operating a user computing device 101 such as a personal computer, handheld computing device or smartphone communicates across a network 102 such as the internet to an online merchant 104 to shop for and consummate an online transaction to acquire some product. This is typically performed by the user operating an application such as a web browser running on the user computing device 101. When the online transaction is complete, online merchant 104 typically sends details of the completed transaction to the user computing device 101 for display to the user typically in a window of the same application running on the user computing device 101. Online merchant 104 also typically sends an email message to the user of user computing device 101 confirming the transaction. Such an order confirmation email message is typically sent from the online merchant 104 to an email server 106 which is accessible to the user computing device 101 via an email application running on the user computing device 101. Subsequently, when the order is ready to be shipped to the user either by the online merchant 104 or by a shipping company 108 acting on behalf of the online merchant 104, a shipping confirmation email message is typically sent from either the online merchant 104 or the shipping company 108 to the email server 106 which is, again, accessible to the user computing device 101 via the email application running on the user computing device. In this way, the user who consummates an online transaction to acquire some product receives an order confirmation and a shipping confirmation of the ordered product.

Figure 2:
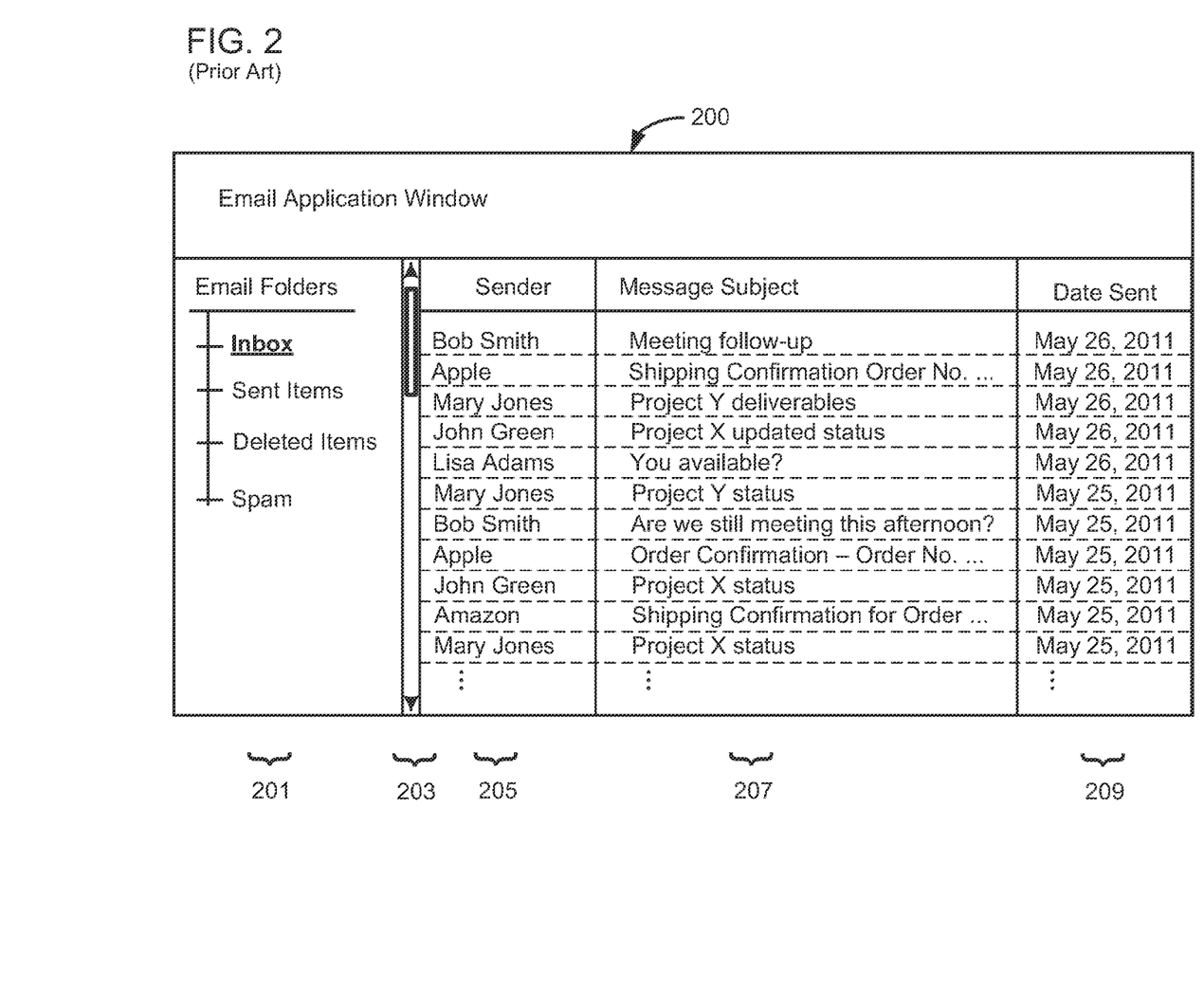
FIG. 2 is an exemplary prior art email application display window.

Referring now to FIG. 2, an exemplary prior art display window 200 of an email application as may be running on the user computing device 101 of FIG. 1 can be seen. As shown in window 200 of the email application is a column of email message folders 201 (e.g., an Inbox folder, a Sent Items folder, a Deleted Items folder and a Spam folder) on the left hand side with the Inbox folder underlined and in bold thereby indicating that it is the currently selected email message folder for display. Next to the email message folders column 201 is a slider bar 203, an email message sender column 205, a message subject line column 207 and an email message sent date column 209. Each displayed email message line in the email message sender column 205, the message subject line column 207 and the email message sent date column 209 corresponds to a single email message and, as is known in the art, slider bar 203 can be used to scroll the displayed email message lines up and down in window 200.

In this way, a user of the email application can view a limited portion of a number of the email messages received by the email application. In particular, in the example shown in FIG. 2, the user can view limited portions of various email messages received by the email application sent from email message senders such as "Bob Smith," "Mary Jones," "John Green," "Lisa Adams," etc., as indicated in email message send column 205. As also shown in this example are limited portions of email messages received from senders such as "Apple" and "Amazon," which are email messages sent by APPLE INC.® of Cupertino, Calif. and AMAZON.COM® of Seattle, Wash., respectively.

The email messages sent by email message senders "Apple" and "Amazon" have corresponding email message subjects as indicated in email message subject line column 207 and corresponding email message sent dates as indicated in email message sent date column 209. In particular, as shown in the figure there are two email messages indicated as being sent by Apple and one email message indicated as being sent by Amazon in the email message sender column 205.

The topmost email message indicated as being sent by Apple has a corresponding email message subject of "Shipping Confirmation Order No. . . . " as shown in the email message subject line column 207 (as is known in the art the remainder of the email message subject line text is cutoff, as indicated by the ellipses, due to the width constraints of the email message subject line column 207) and a corresponding email message sent date of "May 26, 2011." This indicates that Apple sent an email message on May 26, 2011 confirming shipment of an order. The next email message indicated as being sent by Apple has a corresponding email message subject of "Order Confirmation Order No. . . . " with a corresponding email message sent date of "May 25, 2011." This indicates that Apple sent an email message on May 25, 2011 confirming that an order has been placed.

Of course, as is common and known in the art, other information about the shipping confirmation and other information about the order confirmation is contained in the respective email messages themselves (either in the cutoff portion of the email message subject line or the email message body itself) despite not being shown in the email application window 200. Such information can include, for example, the order number, the shipping date, the expected delivery date, the item or items ordered, including their descriptions and quantity, the individual and/or total price paid including any taxes and/or shipping costs, etc. However, as indicated by the example of FIG. 2, such further information is not typically displayed in the email application window 200 thus requiring the user to open each individual email message for display in order to be able to view the further information contained therein. While perhaps not too problematic for a user who has only recently ordered few items, this can become quite troublesome for a user who orders more items over time and particularly when those items are ordered from more than one online merchant and may be shipped by more than one online merchant or shipping company. In this latter case, the user wishing to check what was ordered and when, or wishing to check the shipping status of an order, finds themselves wading through numerous old email messages to find the desired information, having to use the scroll bar 203 to review the hundreds or thousands of old email message lines displayed in email application window 200 by sender, subject and sent date, and may also require moving between those message items displayed in the Inbox folder and those messages displayed in the Deleted Items folder (or those message items displayed in an Archived Items folder (not shown)).

What is needed, therefore, is a way for a user to more readily be able to view information about ordered items.

SUMMARY

In one example is a method of aggregating product order and shipping information, the method comprising: authenticating a user of an email mailbox; receiving authorization to access the email mailbox of the authenticated user; retrieving email message headers from the email mailbox of the authenticated user; identifying email messages of interest by analyzing the retrieved email message headers; retrieving from the email mailbox of the authenticated user email message bodies of the identified email messages of interest; parsing the retrieved email message bodies of the identified email messages of interest to extract the product order and shipping information; storing the extracted product order and shipping information; and, presenting for display to the authenticated user the extracted product order and shipping information.

DETAILED DESCRIPTION OF THE INVENTION

Overcoming the limitations and challenges of the prior art, the present approach aggregates product order and shipping information received via order confirmation emails and shipping confirmation emails thus making it easier for a user to review such product orders.

Figure 3:
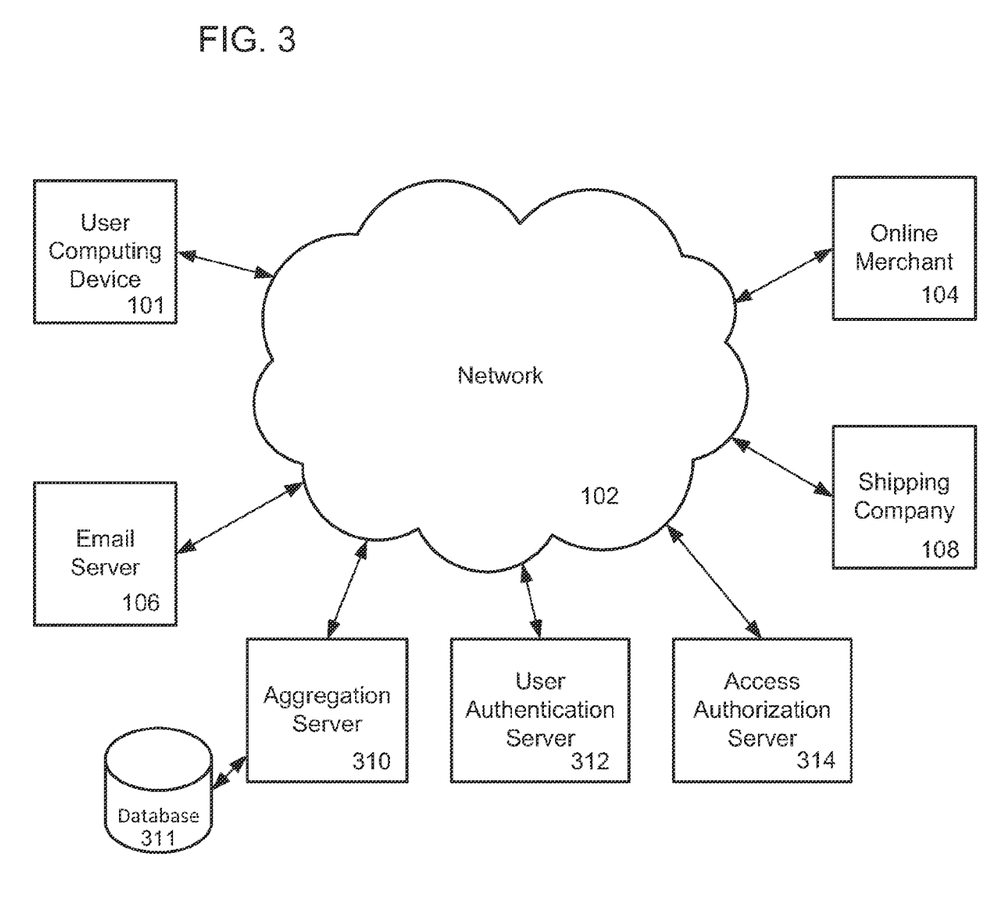
FIG. 3 is an exemplary embodiment and operating environment.

Referring now to FIG. 3, an exemplary embodiment and operating environment can be seen. As with the order and shipping process described with respect to FIG. 1, a user operating user computing device 101 such as a personal computer, handheld computing device or smartphone communicates across network 102 such as the internet to online merchant 104 to shop for and consummate an online transaction to acquire some product. This is typically performed by the user operating an application such as a web browser running on the user computing device 101. When the online transaction is complete, online merchant 104 typically sends details of the completed transaction to the user computing device 101 for display to the user typically in a window of the same web browser application running on the user computing device 101. Online merchant 104 also typically sends an email message to the user of user computing device 101 confirming the transaction. Such an order confirmation email message is typically sent from the online merchant 104 to email server 106 which is accessible to the user computing device 101 via an email application running on the user computing device 101. It is to be understood that email server 106 may be provided by the user's company or may be provided by a third party email service provider. Subsequently, when the order is ready to be shipped to the user either by the online merchant 104 or by the shipping company 108 acting on behalf of the online merchant 104, a shipping confirmation email message is typically sent from either the online merchant 104 or the shipping company 108 to the email server 106 which is, again, accessible to the user computing device 101 via the email application running on the user computing device.

Also present in the embodiment shown in FIG. 3 is an aggregation server 310. Aggregation server 310, as will be explained, aggregates the order information and the shipping information contained in the order confirmation email messages and the shipping confirmation email messages as explained herein. In particular, aggregation server 310 identifies the order confirmation email messages and the shipping confirmation email messages received in the user's email mailbox and parses them to extract the order information and the shipping information contained therein. Aggregation server 310 also stores in a database 311 the extracted order information and shipping information which extracted information can be sent across network 102 to user computing device 101 for display to the user typically grouped by individual product thus greatly simplifying user review of orders. It is to be understood that database 311 and its associated information containing records as described herein are but one possible embodiment and that any known data storage approach can likewise be used to store the information.

Also shown in FIG. 3 is a user authentication server 312 and an access authorization server 314 each optional in some embodiments. User authentication server 312 is used to authenticate a user in some embodiments and access authorization server 314 is used to obtain authorization to access the user's email mailbox in some embodiments, each as explained further elsewhere herein.

Figure 4:
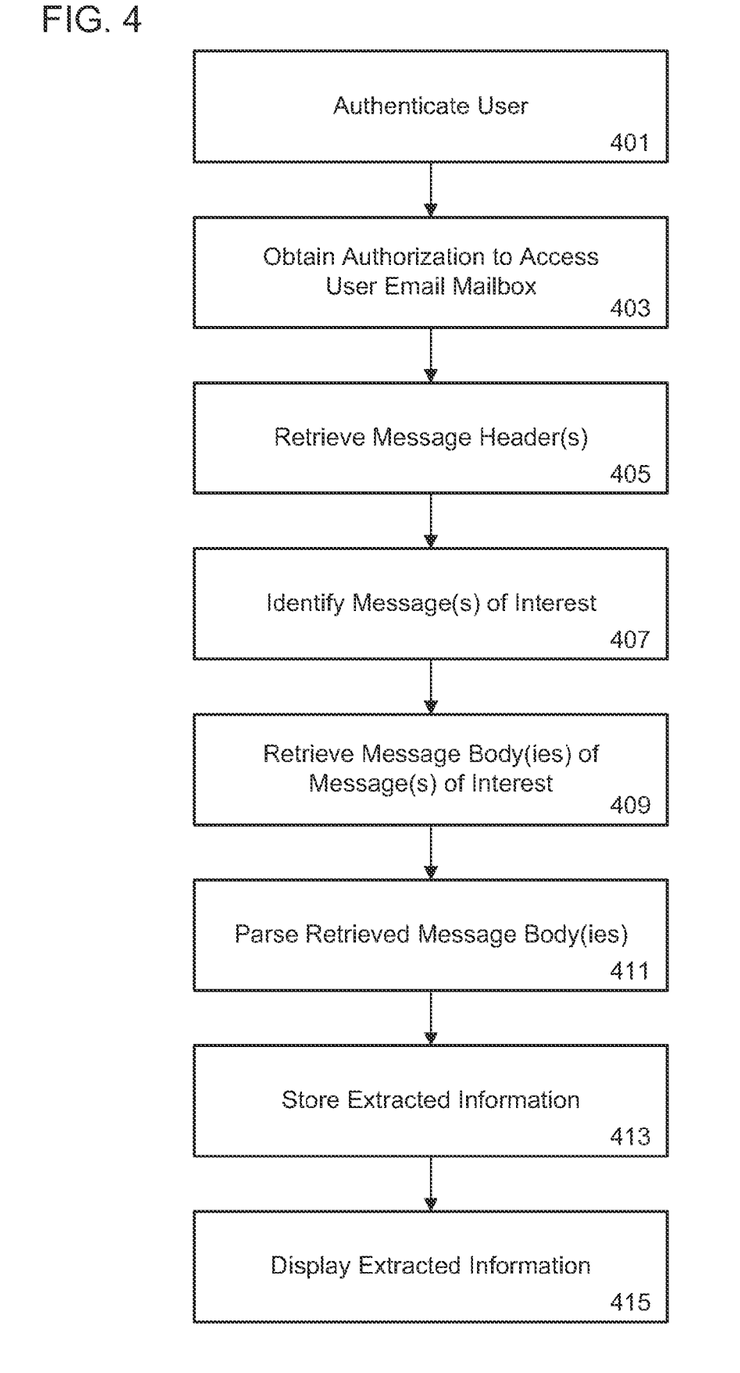
FIG. 4 is a flowchart depicting an aggregation method according to one embodiment.

Referring now to FIG. 4, a flowchart depicting a method according to one embodiment can be seen.

In step 401, the user is authenticated. As is known in the art user authentication is a process of verifying the identity of a user. Authenticating a user can be accomplished in any of a large variety of ways known in the art. Such authentication methods can include receiving from a user a user name and password or some biometric information such as a fingerprint or retinal scan or a security code or key which can then be compared with some stored, known or determined information to thereby authenticate the user. Receipt of such information can occur by it being communicated from user computing device 101 across network 102 to aggregation server 310 of FIG. 3, for example.

In some embodiments, operation of such user authentication methods can involve the user first registering with whomever is providing the order and shipping information aggregation service, for example by the user registering directly with aggregation server 310 using user computing device 101 to communicate with aggregation server 310 across network 102 of FIG. 3.

In other embodiments, third party user authentication services can be employed. For example, user authentication server 312 of FIG. 3 can be used to authenticate the user thereby avoiding having the user register with the aggregation service or share authentication information with the aggregation service. One example of a third party authentication service is one that complies with OpenID®, a known open standard for user authentication in a decentralized manner. In accordance with the OpenID standard, a user establishes an OpenID identifier using user computing device 101 to communicate across network 102 with user authentication server 312 which in this example is operating as an OpenID provider. Aggregation server 310 then receives the user's OpenID identifier from user computing device 101 across network 102. Aggregation server 310 can then communicate the user's OpenID identifier across network 102 to user authentication server 312 which can then authenticate the user on behalf of the user. It is to be understood that this OpenID third party authentication process is known in the art.

In step 403, authorization for the aggregation service to access the user's email mailbox is obtained. As is known in the art access authorization is a process of obtaining permission to enter and/or use some electronic or online resource. In some embodiments this is obtained directly from the user who themselves provides such authorization, for example by communicating the user's email user name and email password from user computing device 101 across network 102 to aggregation server 310 of FIG. 3.

In other embodiments this is obtained indirectly from the user who provides such authorization through a third party service such as, for example, access authorization server 314 of FIG. 3. For example, access authorization server 314 of FIG. 3 can be used to authorize the aggregation service to access the user's email mailbox thereby avoiding the user having to share their user credentials such as email user name and email password with the aggregation service. An example of a third party authorization service is one that complies with OAuth®, a known open standard for users to authorize access to private resources such as an email mailbox stored on one site with another site without having to share their user credentials such as email user name and email password with that other site. Following the OAuth standard, a user operating user computing device 101 obtains a token from access authorization server 314 across network 102 where the token grants access to a specific site such as email server 106. As is known in the art, the access granted via the token can be limited to specific resources, e.g., a particular email account, for a defined duration, e.g., the next 2 hours, etc., thus providing the user the comfort of and ability to control who has access to what and for how long. The token is then communicated by the user from user computing device 101 to aggregation server 310 across network 102 to thereby ultimately provide authorization to aggregation server 310 to access email server 106. Aggregation server 310 then uses the token, in accordance with a sequence of communications steps across network 102 involving user computing device 101, aggregation server 310, access authorization server 314 and email server 106, all as defined by the OAuth standard, to obtain authorized access to email server 106 across network 102. It is to be understood that this OAuth third party authorization process is known in the art.

In other embodiments, as appropriate taking into account such issues as privacy and legal authority, such authorization for the aggregation service to access the user's email mailbox is obtained directly from a provider of the email service. This may be appropriate in the case of an email service provider's user agreement granting the service provider the right to give such authorization. This may also be appropriate in the case of an email service provided by an employer to an employee as, for example, in the case of Yahoo! Inc. of Sunnyvale, Calif. which provides its employees with an email service called Yahoo! Mail, where by virtue of an employment contract or other agreement the employer has the right to authorize access to the employee's email mailbox.

In step 405, email message headers are retrieved from the user's email mailbox using the access authorization obtained in step 403. As is known in the art, an email message typically has a header of data fields about the email message such as who was the sender of the message, what is the subject of the message, when was the message sent and who is to be the message recipient, etc. These header fields are what are typically used to populate an email application window as shown in FIG. 2. In one embodiment, the email message headers are retrieved from the user's email mailbox by aggregation server 310 communicating across network 102 to directly access the user's email mailbox in email server 101 of FIG. 3 using mail access protocols known in the art. In another embodiment, the email message headers are retrieved from the user's email mailbox by aggregation server 310 communicating across network 102 with a request to email server 101 of FIG. 3 to perform a search of the user's email messages and return those having an email message header with a sender being a known online merchant such as "Apple" or "Amazon" or an email message header with a subject line text that matches keywords such as "order confirmation," "shipping confirmation," etc.

In step 407, email messages of interest are identified. In one embodiment, this occurs within aggregation server 310 of FIG. 3 which filters the retrieved email message headers to identify email messages sent by a known online merchant. Examples include an email message header indicating that the email message was sent by "Apple" or by "Amazon." Another example is when an email message header indicates that the email message was sent by a third party known to send such email messages on behalf of an online merchant. This filtering process can also identify email messages of interest by recognizing those email message headers that contain text in the email message subject line that corresponds to known order confirmation subject line text or known shipping confirmation subject line text. Examples include an email message sent with a subject line containing the text "purchase," "order," "ordered," "shipment," "shipping," "shipped," "invoice," "confirmed," "confirmation," "notification," "receipt," "return," "pre-order," "pre-ordered," "tracking," "on its way," "received" "ereceipt," "package," etc.

In step 409, the email message bodies for the identified email messages of interest are retrieved from the user's email mailbox using the access authorization obtained in step 403. As is known in the art, an email message typically has a message body which contains the main part of the email message itself and is what is typically viewed by a user when an email message is opened. In one embodiment, this retrieval is accomplished by aggregation server 310 requesting the email message body for the identified email messages of interest from email server 106 across network 102 of FIG. 3 using mail access protocols known in the art. Identification of which message bodies are being requested can be accomplished in various ways known in the art including requesting each by email message identifier obtained from the email message header of the identified email messages of interest in step 407. In an alternative embodiment, step 405 and step 409 are combined into a single retrieval step with identification step 407 occurring afterwards.

In step 411, the retrieved email message bodies for the identified email messages of interest are parsed to extract the order information and/or shipping information contained therein. Such parsing operation can occur in a variety of known ways. However, because the text contained in email message bodies is of a free form nature (as opposed to the structured tagged elements in a hypertext markup language (HTML) web page which delineate and make recognizable the various fields or elements of the web page), in one embodiment predefined templates are used that have been specifically created to identify the various individual elements or entities of interest in a given email from an online merchant. Use of these predefined templates to parse a retrieved email message body occurs within aggregation server 310 of FIG. 3 as will be explained further elsewhere herein.

Further, because it is known from step 407 which online merchant sent the email message of interest and whether the email message is an order confirmation or a shipping confirmation, a template specific to the online merchant and type of confirmation is used. Still further, because email message bodies can, as is known in the art, be in either a text or HTML format a template specific to the type of email message body format is used. It is to be understood that even though an email message body may be in an HTML format the email message body is still of a free form nature because it lacks recognizable structured tag elements that exist, for example, in an HTML web page.

As such, for each online merchant there are typically four different parsing templates which can be used in this embodiment: i) a text order confirmation template; ii) an HTML order confirmation template; iii) a text shipping confirmation template; and iv) an HTML shipping confirmation template. Of course, for some online merchants there are greater or fewer templates depending simply upon what are the various forms of confirmation email messages a given online merchant typically sends. Regardless of the number of templates for a given merchant, each template is specific as to the known particular entities typically included and the order they typically occur within each type of email confirmation message sent by that merchant.

In this embodiment, context-free grammars (CFGs) are used to parse fields from an identified email message of interest. Of note, however, is that rather than using grammars for parsing natural language (e.g., English) structures the present approach uses defined smaller grammars describing a particular email message format, for example: "(Greetings from (Details about order)(Details about item 1)(Details about 2) . . . (Details about itemN)(Tax and totals calculation)," etc. And although those of skill in the art commonly define CfGs in a format known as Backus-Naur Form (BNF), in this embodiment templates have been created so a user does not themselves have to define such grammars. It is to be understood, however, that these templates are used for data extraction rather than for the more common purpose of templates which is data generation.

The created templates are themselves a grammar. As such, these created templates are converted, using a tool known in the art as Another Tool for Language Recognition (ANTLR), into mail-specific grammars. ANTLR is then used again to convert these grammars into a mail-specific extraction parser which aggregation server 310 can then use to parse the email message bodies to extract the entities of interest from them. Examples of such extracted entities include merchant name, order number, order date, product description, product name, product quantity, product price, sales tax, shipping cost, order total, billing address, shipping company, shipping address, estimated shipping date, estimated delivery date, tracking number, etc.

In step 413, the extracted product order and/or shipping information is stored. In one embodiment, if the email message of interest is an order confirmation then a new database record is created by aggregation server 310 in database 300 of FIG. 3 and the relevant information from the email message header and the extracted entities from the order confirmation email message body are added to the database record. Likewise, if the email message of interest is a shipping confirmation for a previously received order confirmation, then the relevant information from the email message header and the extracted entities from the shipping confirmation email message body are added to the previously created database record or is added as another record to the database.

In one embodiment an email message identifier of the email message of interest is also stored in the database record no that the email message of interest can later be retrieved from the user's email mailbox should that be desired for any reason. Alternatively, some or all of the email message itself can be stored in the database record for later retrieval.

It is to be noted that sometimes a shipping confirmation email message for a given ordered product is identified as an email message of interest before an order confirmation email message for that ordered product is identified as an email message of interest. This can occur for various reasons, for example, in the case of an order confirmation email message not being received in the user's email mailbox or being deleted by a user or inadvertently treated as spam before the above process has occurred likewise, sometimes multiple identical or very similar order confirmation email messages or shipping confirmation email messages are sent by an online merchant or a shipping company thus seemingly causing duplicate confirmation email messages. Handling these out of sequence or duplicate email messages in a way that avoids multiple record entries for the same ordered product will now be explained.

Figure 5:
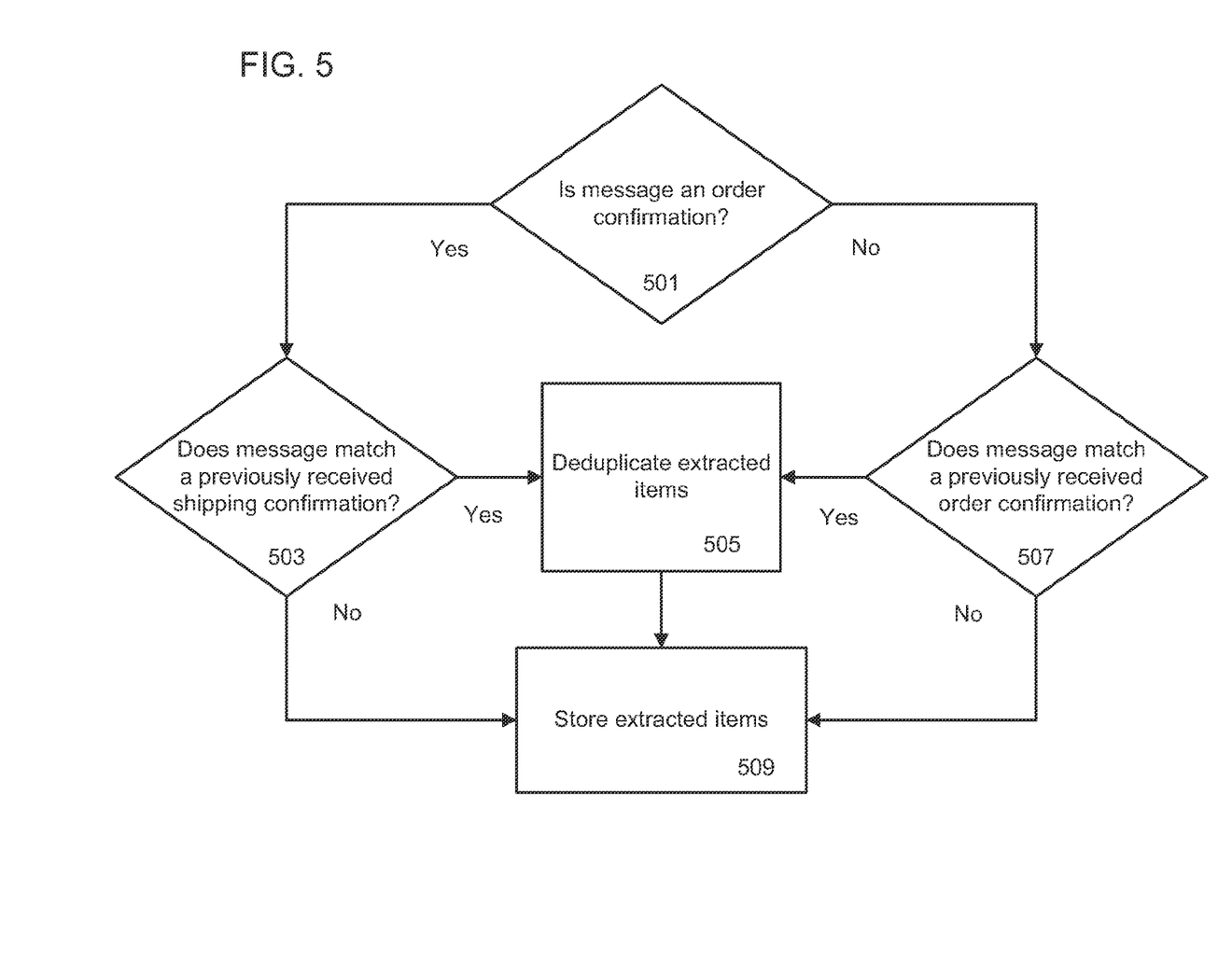
FIG. 5 is a flowchart depicting a method of handling out of sequence or duplicate email messages according to one embodiment.

Referring now to FIG. 5, a flowchart depicting a method of handling out of sequence or duplicate email messages according to one embodiment of the present approach can be seen. In one embodiment, this occurs within aggregation server 310 of FIG. 3 and is part of step 413 of FIG. 4.

In step 501, it is determined whether the identified email message of interest is an order confirmation message. If the identified email message of interest is an order confirmation message then, in step 503, it is determined whether it corresponds to a previously receiving shipping confirmation message. In one embodiment this determination is made by comparing extracted entity information such as order number, item identification and/or stock keeping unit (SKU), item description, etc. If it does not correspond to a previously received shipping confirmation message then, in step 505, a database record is created and the extra led entities are stored in the database record. Alternatively, if it does correspond to a previously received shipping confirmation message then, in step 509, the extracted entities from the email message of interest are compared with previously stored extracted entities to eliminate any duplicate data (a deduplication process) before storing them, along with any extracted new entities, in the previously created database record in step 505.

Referring back to step 501, if the identified email message of interest is not an order confirmation message (hence it is a shipping confirmation message) then, in step 507, it is determined whether it corresponds to a previously received order confirmation message. In one embodiment this determination is made using essentially the same process described above with respect to step 503. If it does not correspond to a previously received order confirmation then, in step 505, a database record is created and the extracted entities are stored in the database record. Alternatively, if it does correspond to a previously received order confirmation message then, in step 509, the extracted entities from the email message of interest are compared with previously stored extracted entities to eliminate any duplicate data (again, a deduplication process) before storing them, along with any extracted new entities, in the previously created database record in step 505.

It is to be understood that the process described with reference to FIG. 5 works when a single shipping confirmation email is received for a one or more products in a single order confirmation email as well as when multiple shipping confirmation emails are received each shipping confirmation email corresponding to less than all of the one or more products in a single order confirmation email.

Referring again to FIG. 4, in step 415, the extracted product order and/or shipping information is presented for display to the user. In one embodiment, the stored extracted product order and/or shipping information is retrieved from database 311 of FIG. 3. This information can then be sent across network 102 to user computing device 101 of FIG. 3, for display to the user as will now be explained.

Figure 6:
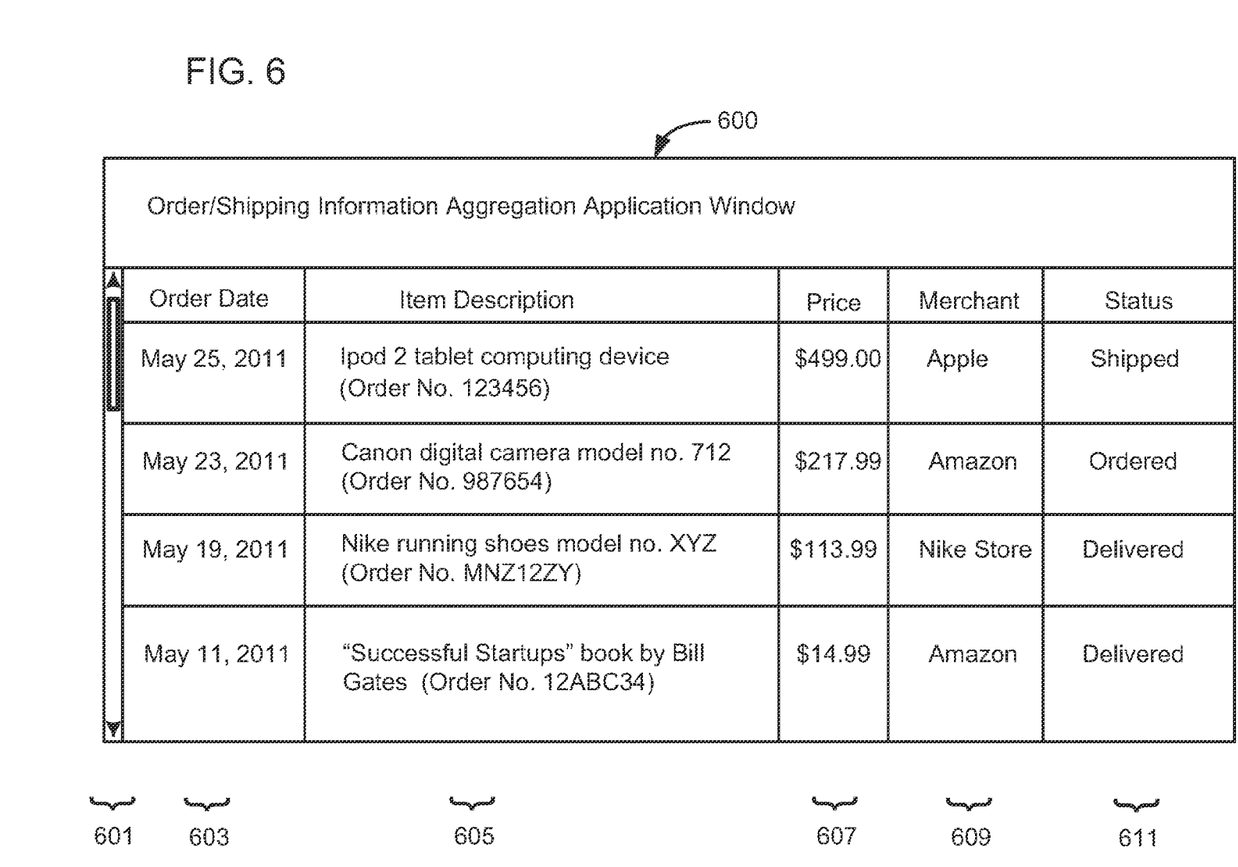
FIG. 6 is an exemplary display of extracted product order and/or shipping information.

Referring now to FIG. 6, an exemplary display of the extracted product order and/or shipping information can be seen. In this example, an order/shipping information aggregation (OSIA) application window 600, as may be displayed on user computing device 101 of FIG. 1, can be seen. Within OSIA application window 600 are various columns including slider bar 601, product order date column 603, product item description column 605, product price column 607, online merchant column 609 and product order/shipping status column 611.

In this example it is to be noted that each row displays a grouping of extracted entity product order and/or shipping information for an individual product. For example, the first display row shows in item description column 605 that an "iPad 2 tablet computing device" with "Order No. 123456" was ordered on "May 25, 2011," as shown in order date column 603, with a price of "$499.00," as shown in price column 607, from merchant "Apple," as shown in online merchant column 609, and the status of the order is that the product has "Shipped," as shown in status column 611. Also shown are other examples of extracted entity product order and/or shipping information for other individual products purchased from other online merchants.

It is to be understood that although the example shown in FIG. 6 is of a display of the extracted product order and/or shipping information in an OSIA application window, this same information can, instead, be displayed within a display window of some other application running on either the aggregation server 310 or user computing device 101 such as, for example, an email application.

It is to be understood that although the examples and description herein refer to the merchant as an online merchant, the present approach is equally applicable to any merchant, online or otherwise, who provides such order and/or shipping confirmation emails.

It is to be understood that, while a number of the examples are described herein as operations running on, for example aggregation server 310, the described operations can all be implemented in software stored in a computer readable storage medium for access as needed to either run such software on the appropriate processing hardware of a server or user computing device.

It is to be understood that the examples noted here are only for illustrative purposes and there may be further embodiments possible with a different set of components. While several embodiments are described, there is no intent to limit the disclosure to the embodiment or embodiments disclosed herein. On the contrary, the intent is to cover all alternatives, modifications, and equivalents obvious to the ones familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention cat be utilized in any number of environments and applications beyond those described herein without departing from the broader spirit and scope of the specification. The specification and drawings are, accordingly, to be regarded as illustrative rather than restrictive, it will be recognized that the terms "comprising," "including," and "having," as used herein, are specifically intended to be read as open-ended terms of art.

What is claimed is:

1. A method of aggregating product order and shipping information, the method comprising:
   authenticating a user of an email mailbox;
   receiving authorization to access the email mailbox of the authenticated user;
   retrieving email message headers from the email mailbox of the authenticated user;
   identifying email messages from which the product order and shipping information is to be extracted, by identifying those email messages in which the retrieved headers contain a known email message sender and email message subject substring;
   retrieving from the email mailbox of the authenticated user email message bodies of the identified email messages;
   extracting the product order and shipping information from the retrieved email message bodies of the identified email messages by applying to the retrieved email message bodies a template specific to the email message sender, the email message subject substring, and a type of email message body format;
   storing the extracted product order and shipping information; and,
   presenting for display to the authenticated user the extracted product order and shipping information.

2. The method of claim 1 wherein authenticating the user of the email mailbox is by receiving a valid user name and password for the user.

3. The method of claim 2 wherein receiving authorization to access the email mailbox of the authenticated user uses a mail access protocol to communicate the valid user name and password for the user across a network with a mail server for the email mailbox of the authenticated user.

4. The method of claim 1 wherein authenticating the user of the email mailbox is by communicating across a network to a third party user authentication server.

5. The method of claim 1 wherein the email mailbox of the authenticated user is provided by a third party email service provider.

6. The method of claim 1 wherein receiving authorization to access the email mailbox of the authenticated user is by communicating across a network to a third party access: authorization server.

7. The method of claim 1 wherein the email message sender is a merchant of the product.

8. The method of claim 1 wherein the message subject substring includes at least one of the following: purchase, order, ordered, shipment, shipping, shipped, invoice, confirmed, confirmation, notification, receipt, return, pro-order, pre-ordered, tracking, on its way, received, fulfilled, receipt and package.

9. The method of claim 1 wherein retrieving from the email mailbox of the authenticated user email message bodies of the identified email messages of interest uses a mail access protocol to communicate email message identifications of the email messages of interest to a mail server for the email mailbox of the authenticated user.

10. The method of claim 1 wherein the type of email message body format is text.

11. The method of claim 1 wherein the type of email message body format is hypertext markup language.

12. The method of claim 1 wherein storing the extracted product order and shipping information further comprises eliminating duplicate extracted product order and shipping information.

13. The method of claim 1 wherein presenting for display to the authenticated user the extracted product order and shipping information includes grouping the extracted product order and shipping information by individual product.

14. The method of claim 13 wherein presenting for display to the authenticated user the extracted product order and shipping information further comprises eliminating duplicate extracted product order and shipping information.

* * * * *